United States Patent [19]

Nakatani et al.

[11] 4,399,508

[45] Aug. 16, 1983

[54] CASH CHECKING READ OPERATION IN AN ELECTRONIC CASH REGISTER

[75] Inventors: Hiroshi Nakatani, Yamatokoriyama; Hachizou Yamamoto, Nara, both of Japan

[73] Assignee: Sharp Kabushiki Kaisha, Osaka, Japan

[21] Appl. No.: 301,961

[22] Filed: Sep. 14, 1981

[30] Foreign Application Priority Data

Sep. 19, 1980 [JP] Japan .................................. 55-131340

[51] Int. Cl.³ .................. G07G 5/00; G06C 29/00; G06F 3/12
[52] U.S. Cl. ..................................... 364/405; 235/2; 235/7 R; 235/60 P
[58] Field of Search ................... 235/2, 7, 3, 10, 60 P, 235/419, 431; 364/405, 404

[56] References Cited

U.S. PATENT DOCUMENTS 4,142,235 2/1979 Tadakuma ........................... 364/405

Primary Examiner—Harold I. Pitts
Attorney, Agent, or Firm—Birch, Stewart, Kolasch & Birch

[57] ABSTRACT

A read operation control system is included in an electronic cash register for checking purposes. The actual read operation is not conducted until the operator introduces numeral data indicating the cash amount contained in a drawer case of the electronic cash register. The thus introduced numeral data is compared with accumulated data stored in a memory section of the electronic cash register, the accumulated data representing the total cash amount registered into the electronic cash register. The difference between the introduced numeral data and the accumulated data is calculated, and the calculation result is printed out onto a check list.

7 Claims, 6 Drawing Figures

CASH CHECKING READ OPERATION IN AN ELECTRONIC CASH REGISTER

BACKGROUND AND SUMMARY OF THE INVENTION

The present invention relates to an electronic cash register and, more particularly, to a read operation in an electronic cash register.

Generally, an electronic cash register includes a drawer case secured to the body of the electronic cash register. A typical construction of the above-mentioned electronic cash register is disclosed in U.S. Pat. No. 4,159,533, "ELECTRONIC CASH REGISTER" by Haruo Sakurai, issued on June 26, 1979.

The electronic cash register is normally constructed to perform a read operation to check the accuracy of the registration operation. In the conventional system, the read operation is conducted based only on the transaction data registered in the electronic cash register. Therefore, there is no check system for checking whether the actual amount of the cash contained in the drawer case is identical with the cash in drawer data stored in a memory of the electronic cash register.

Accordingly, an object of the present invention is to provide a novel read operation control system in an electronic cash register.

Another object of the present invention is to correlate the actual amount of the cash contained in the drawer case with a read operation conducted by the electronic cash register.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a read operation control system is constructed to prohibit the actual read operation before the operator manually introduces the numeral information related to the actual amount of cash contained in the drawer box. At the end of the read operation, the actual amount manually introduced through the keyboard panel is compared with the data showing the cash in drawer and stored in a memory section in the electronic cash register.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIGS. 2 through 5 are flow charts for explaining operation modes of the electronic cash register of FIG. 1, wherein FIG. 2 shows a mode determination operation, FIG. 3 shows an operation in a registration mode, FIG. 4 shows an operation in a read mode, and FIG. 5 shows an operation in a reset mode.

DESCRIPTION OF THE PREFERRED EMBODIMENTS

Figure 2:
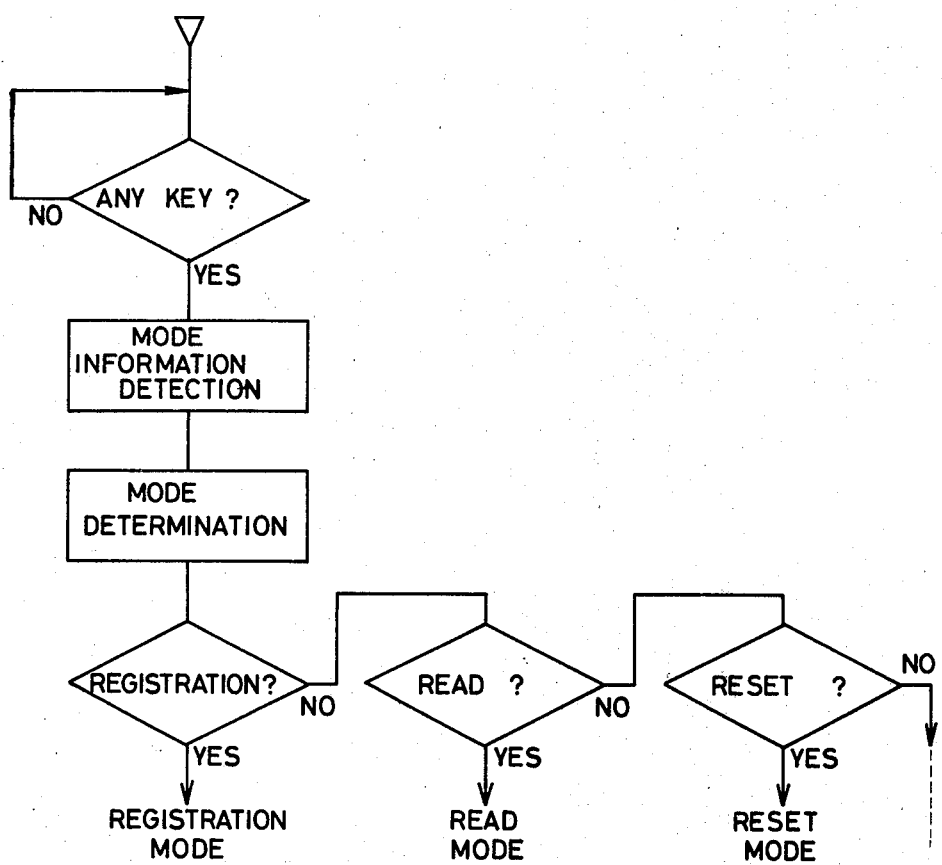

An electronic cash register comprises a keyboard panel 10 including numeral keys 12 and function keys 14, a central processor unit 16 for controlling various operations in the electronic cash register, and a main memory 18 for storing the transaction data introduced into the electronic cash register. A mode selection switch 20 is included in the keyboard panel 10 for selecting a desired operation mode to be performed by the electronic cash register. The mode selection data introduced through the mode selection switch 20 is stored in a buffer memory 22. The mode selection operation is conducted before any data is introduced into the electronic cash register. Numeral data introduced through the numeral keys 12 is applied to the central processor unit 16 via a key encoder 24. Function determination data introduced through the function keys 14 is also applied to the central processor unit 16 via a key determination circuit 26. When any one of the keys included in the numeral keys 12 and the function keys 14 is actuated, a mode detection control circuit 28 is activated to detect the mode selection data temporarily stored in the buffer memory 22. The mode selection data temporarily stored in the buffer memory 22 is transferred to a mode determination circuit 30. The thus transferred mode selection data is applied from the mode determination circuit 30 to a mode control area 32 included in the central processor unit 16. The above-mentioned mode determination operation is illustrated in the flow chart of FIG. 2. The central processor unit 16 functions to select a predetermined program stored in a read only memory 34 in accordance with the mode selection data applied to the mode control area 32. Then, the following operation is controlled in accordance with the programs stored in the read only memory 34.

In a preferred system of the present invention, the central processor unit 16 is a "CPU LH-0080" manufactured by Sharp Corporation, and the read only memory 34 is a "ROM TM-2364" manufactured by Toshiba Corporation.

The electronic cash register of the present invention further comprises a display unit 36, a printer unit 38 for printing out the transaction data onto a receipt slip and/or a journal paper, a drawer case 40 for containing cash therein, and a drive controller 42 for opening the drawer case 42 at a desired time.

Figure 1:
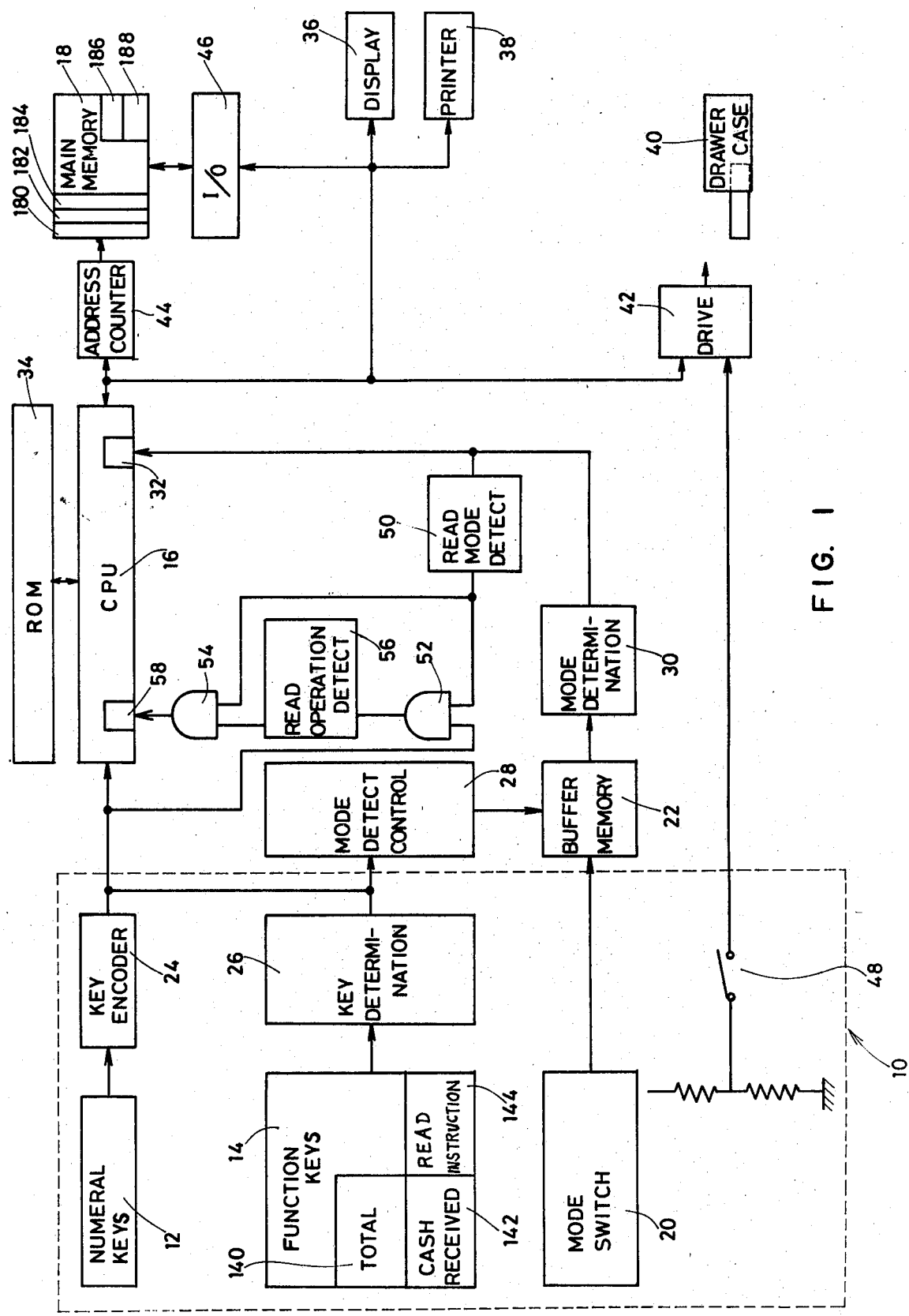
FIG. 1 is a block diagram of an embodiment of an electronic cash register of the present invention.

Operations in the normal registration mode, the read mode and the reset mode will be described with reference to FIG. 1 and the flow charts shown in FIGS. 2 through 5.

To perform the normal registration operation, the registration mode is selected through the use of the mode selection switch 20. The mode selection data for selecting the registration mode is temporarily stored in the buffer memory 22. When the numeral keys 12 are actuated for introducing the numeral data indicating the number of articles being purchased, the mode detection control circuit 28 is enabled to transfer the mode selection data stored in the buffer memory 22 to the mode determination circuit 30, thereby selecting the normal registration program stored in the read only memory 34. The numeral data introduced from the numeral keys 12 is applied to the central processor unit 16 via the key encoder 24. The operator then actuates any one of the department keys included in the function keys 14 to present information as to which department the purchased commodity belongs. The department identifying signal derived from the function keys 14 is applied to the central processor unit 16 via the key determination circuit 26. In response thereto, the central processor unit 16 functions to read out the unit cost data previously preset in a unit cost memory section 182 in the main memory 18 through the use of an address counter 44 and an input/output control circuit 46. The central processor unit 16 performs the calculation, (the commodity number)×(unit cost), and the calculation result is introduced into a transaction memory section 184 and stored therein. The calculation result is also applied to the display unit 36 and the printer unit 38. The main memory 18 includes a department address section 180.

The above-mentioned operation is repeated to register the entire transaction data related to a specific customer. When the registration operation related to the specific one customer is completed, a total key 140 included in the function keys 14 is actuated to indicate the completion of the registration operation. The central processor unit 16 functions to calculate the total amount purchased by the specific customer and the calculation result is introduced into and accumulated in an accumulation section 186 which stores the accumulated amount conducted in one day. The total amount calculated by the central processor unit 16 is applied to the display unit 36 and the printer unit 38.

Thereafter, the cash amount received from the customer is introduced through the numeral keys 12 and a cash received key 142 included in the function keys 14 is actuated. The central processor unit 16 functions to compare the total amount calculated by the central processor unit 16 with the introduced money information indicating the cash received from the customer, and to obtain the change amount and, then, functions to deliver the receipt slip. When the above operation is completed, the total amount purchased by the customer is applied to a cash in drawer data memory section 188 and accumulated therein. Further, the transaction data related to the specific customer temporarily stored in the transaction memory section 184 is cleared.

Figure 3:
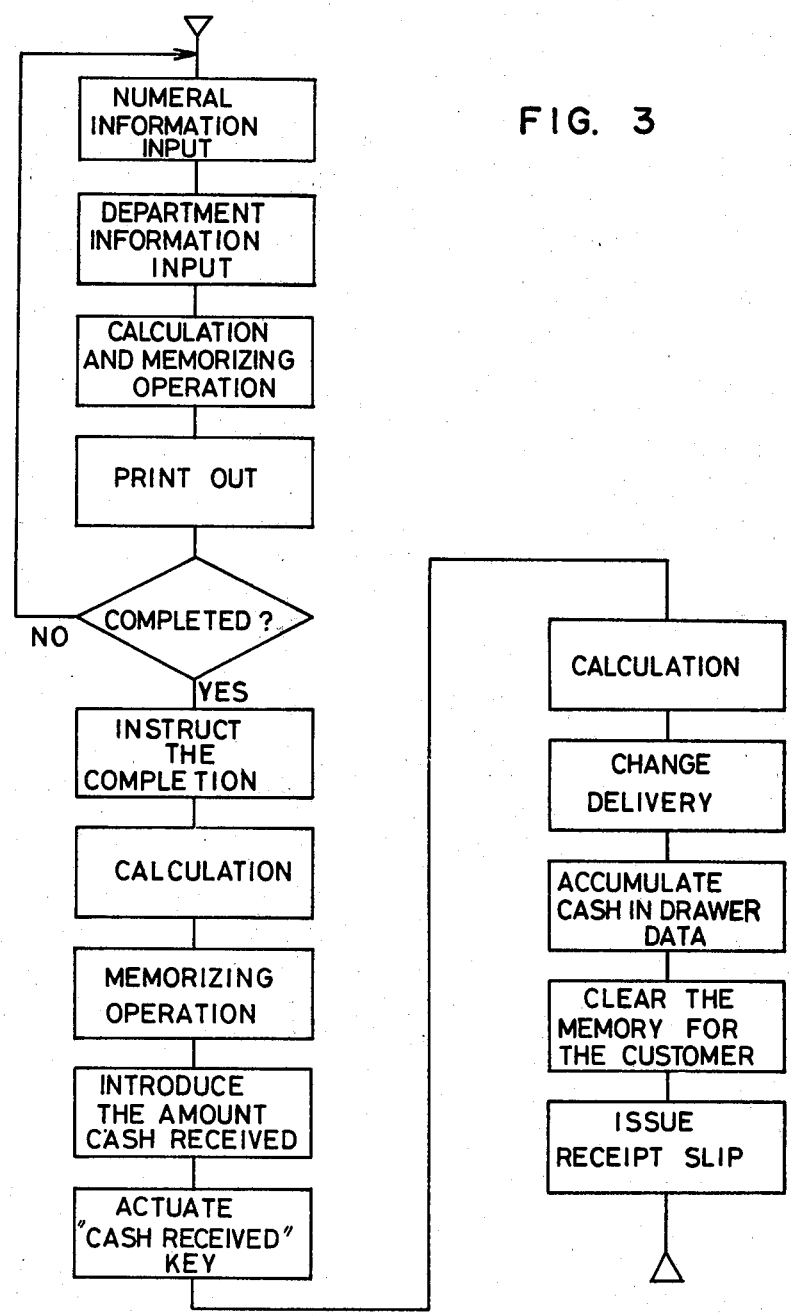

The above-mentioned registration operation is shown in the flow chart of FIG. 3. When the total key 140 is actuated, the drive controller 42 is activated to open the drawer case 40, whereby the operator puts the received money into the drawer case 40 and takes out the change from the drawer case 40.

When the read operation is desired to be performed, the read mode is selected through the mode selection switch 20. The read operation is not actually conducted even when a read instruction key 144 included in the function keys 14 is actuated before the cash data contained in the drawer case 40 is first mutually introduced into the electronic cash register.

After selecting the read mode through the use of the mode selection switch 20, a manual open switch 48 disposed on the keyboard panel 10 is actuated to open the drawer case 40. The operator calculates the cash amount contained in the drawer case 40, and the total amount contained in the drawer case 40 is manually introduced into the central processor unit 16 from the numeral keys 12 through the key encoder 24. When the numeral keys 12 are actuated to introduce the cash information related to the amount contained in the drawer case 40, the mode detection control circuit 28 is activated to transfer the read mode selection data temporarily stored in the buffer memory 22 to the mode determination circuit 30. The read mode selection data is applied to the mode control area 32 in the central processor unit 16 for performing the read operation in accordance with the read mode program stored in the read only memory 34. The read mode selection data 32 derived from the mode determination circuit 30 is also applied to a read mode detection circuit 50 which functions to place AND gates 52 and 54 in the operative conditions.

Under these conditions, the numeral data indicating the cash amount contained in the drawer case 40 is applied to a read operation detection circuit 56 via the AND gate 52. The read operation detection circuit 56 detects the numeral data introduced from the keyboard panel 10 in the read operation mode. The read operation detection output derived from the read operation detection circuit 56 is applied to a read instruction area 58 in the central processor unit 16 to set a flag in the read instruction area 58, thereby actually placing the electronic cash register in the read operation mode.

Figure 6:
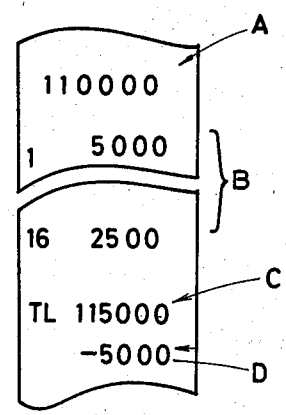
FIG. 6 is a chart showing an example of a printout in the read mode shown in FIG. 4.

The central processor unit 16 detects the flag in the read instruction area 58 and functions to print out the introduced money information onto the receipt slip through the use of the printer unit 38. After introducing the numeral information indicating the cash amount contained in the drawer case 40, the operator actuates the read instruction key 144 included in the function keys 14. In response thereto, the central processor unit 16 conducts the read operation in accordance with the read operation program stored in the read only memory 34. That is, the transaction data stored in the main memory 18 is progressively read out through the input/output control circuit 46 and applied to the printer unit 38. FIG. 6 shows an example of a printout in the read mode. "A" represents the cash amount manually introduced from the numeral keys 12. "B" represents the transaction data which is printed out in the read mode. When the accumulated data stored in the cash in drawer data memory section 188 is read out, the central processor unit 16 functions to print out the stored data and to compare the accumulated data stored in the cash in drawer data memory section 188 with the numeral data manually introduced by the operator. And if any difference exists between the two, the difference is calculated by the central processor unit 16 and the calculation result is printed out onto the receipt slip.

Figure 4:
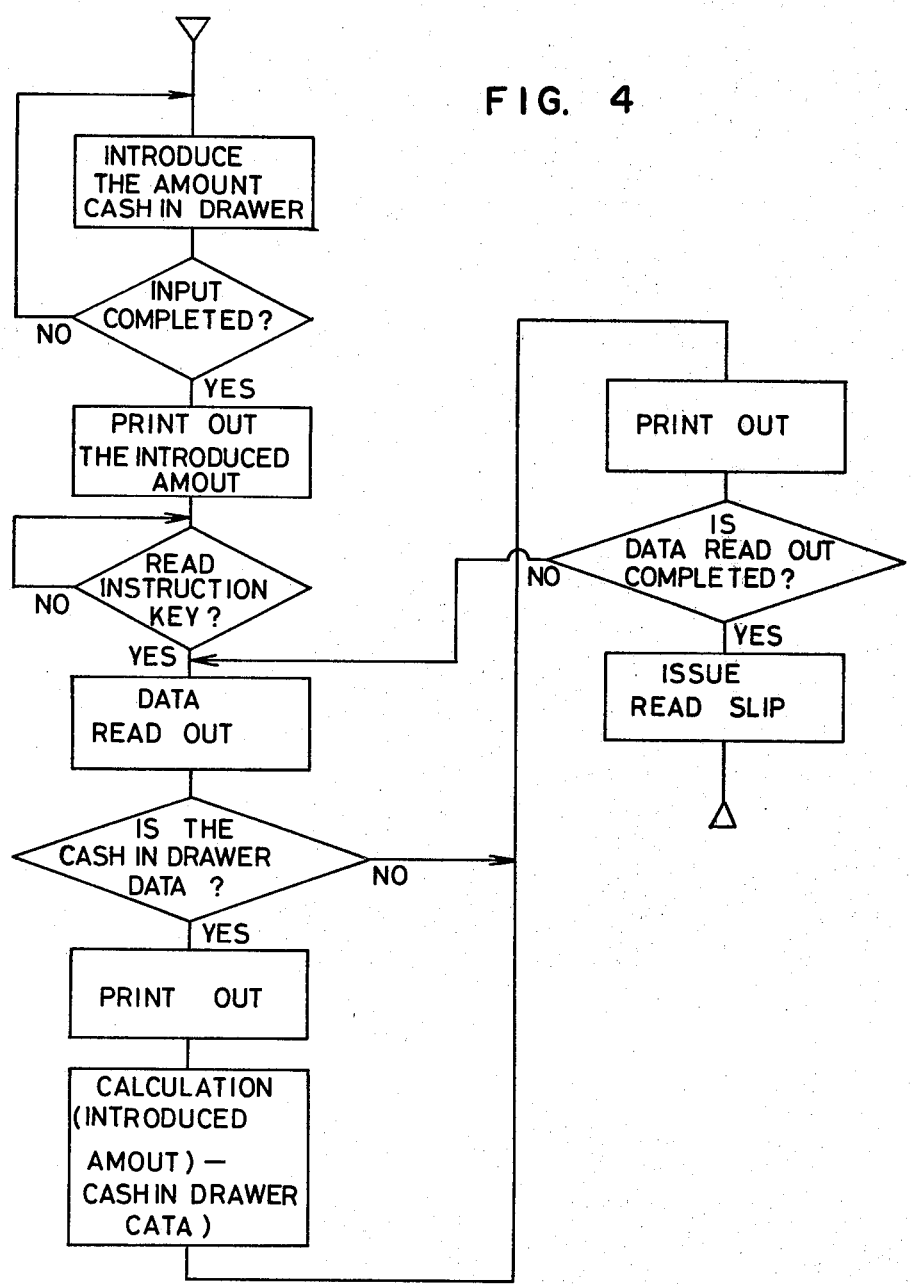

The above-mentioned read operation is illustrated in the flow chart of FIG. 4. In FIG. 6, "C" represents the total amount accumulated in the cash in drawer data memory section 188, and "D" represents the difference between the total amount stored in the cash in drawer data memory section 188 of the main memory 18 and the cash amount actually contained in the drawer case 40.

Figure 5:
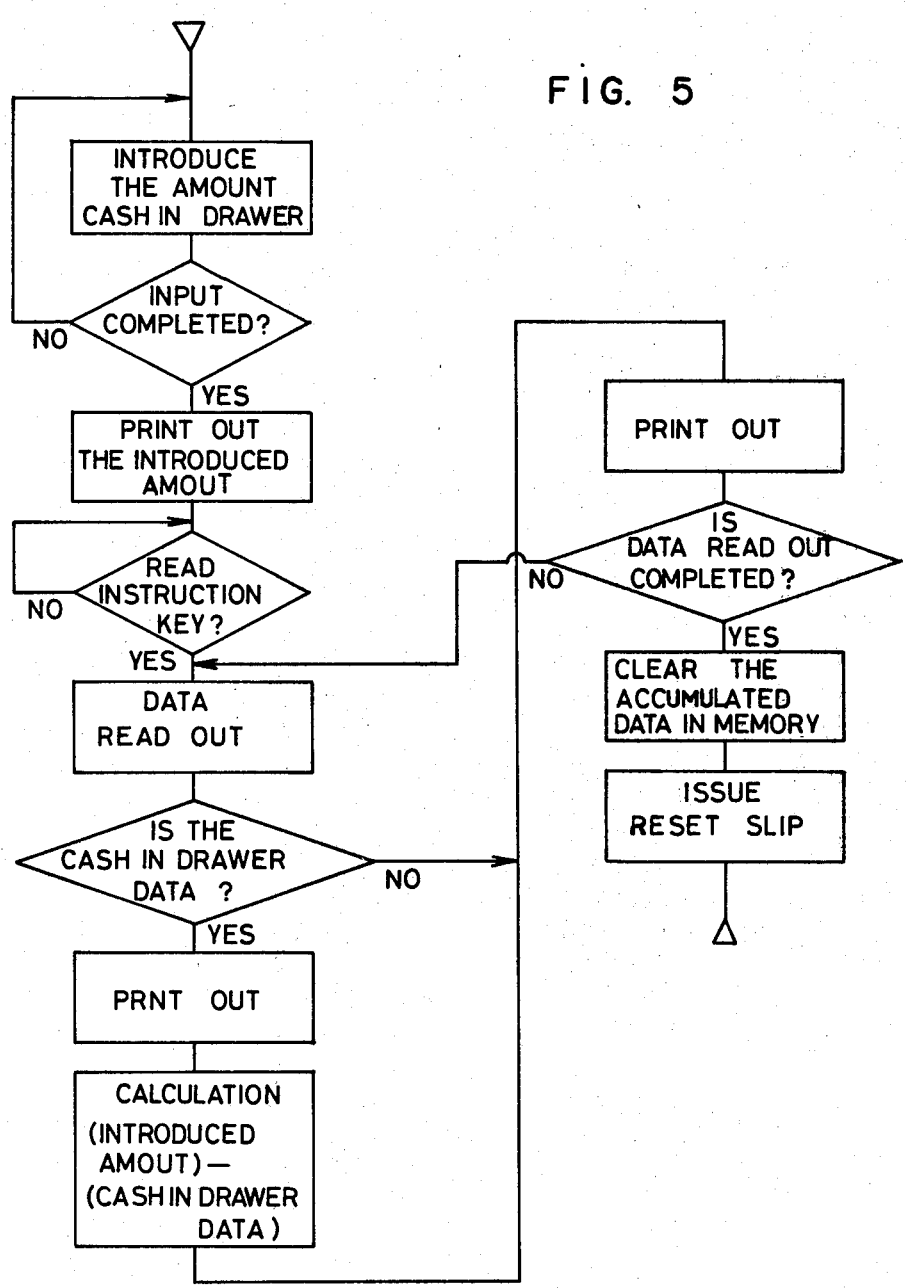

When the reset mode is selected through the mode selection switch 20, the operation is conducted in accordance with the flow chart shown in FIG. 5. The operation is similar to that conducted in the read mode. However, in the reset mode, the total amount accumulated in the cash in drawer data memory section 188 is cleared at the end of the operation.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electronic cash register comprising:

a main housing for said electronic cash register;
a drawer case secured to said main housing for containing cash received from customers;
a keyboard panel for introducing transaction data into said electronic cash register; and
a read operation control system for controlling a read operation conducted by said electronic cash register, said read operation control system comprising:
   a read mode switch for placing said electronic cash register in a read mode;
   read operation detection means for developing a read operation detection output when numeral data indicating the cash amount contained in said drawer case is introduced from said keyboard panel when said register is in said read mode;
   read instruction switch means disposed on said keyboard panel for instructing the reading operation of the transaction data stored in a memory of said electronic cash register;
   printer means for printing out the transaction data stored in said memory and read out from said memory in response to an actuation of said read instruction switch means; and means for prohibiting said reading operation instructed by said read instruction switch means when said read operation detection output is not developed from said read operation detection means.

2. The electronic cash register of claim 1, further comprising a manual open switch for opening said drawer case in said read mode.

3. An electronic cash register comprising:
a main housing for said electronic cash register;
a drawer case secured to said main housing for containing cash received from customers;
a keyboard panel disposed on said main housing, said keyboard panel including:
   numeral keys for introducing numeral data;
   function keys for introducing function identifying signals; and
   mode selection switch means for selecting a desired operation mode of said electronic cash register from a normal registration mode, a read mode and a reset mode;
a central processor unit for controlling the operation of said electronic cash register;
a read only memory for storing various programs for controlling the operation of said electronic cash register in said normal registration mode, read mode and reset mode, said programs stored in said read only memory being applied to said central processor unit for controlling the operation of said electronic cash register;
a main memory for storing transaction data introduced from said keyboard panel, said main memory including an accumulation memory section for storing cash in drawer data registered into said electronic cash register;
a printer unit for printing out the transaction data onto a receipt slip and/or a journal paper; and
a read operation control system for controlling the read operation in said read mode, said read operation control system comprising:
   print control system for printing out the transaction data stored in said main memory through the use of said printer unit; and
   means for prohibiting the operation of said print control system before the cash amount contained in said drawer case is manually introduced into said central processor unit from said numeral keys in the read mode.

4. The electronic cash register of claim 3, said read operation control system further comprising:
   read operation detection means for developing a read operation detection output when said cash amount is introduced from said numeral keys in said read mode; and
   read instruction switch means included in said function keys for activating said print control system in said read mode,
      wherein said means for prohibiting inhibits the signal generated by actuation of said read instruction switch means when said read operation detection output is not developed from said read operation detection means.

5. The electronic cash register of claim 3 or 4, wherein said central processor unit functions to compare said cash amount manually introduced from said numeral keys in the read mode with said cash in drawer data stored in said accumulation memory section included in said main memory, and to obtain the difference between said cash amount and said cash in drawer data.

6. The electronic cash register of claim 5, further comprising:
   a total key included in said function keys for indicating a completion of a registration operation of the transaction data related to one customer; and
   a drawer drive control system for opening said drawer case when said total key is actuated in said normal registration mode.

7. The electronic cash register of claim 6, further comprising:
   a manual open switch disposed on said keyboard panel for opening said drawer case in said read mode.

* * * * *